US010604017B2

(12) United States Patent
Maruyama et al.

(10) Patent No.: US 10,604,017 B2
(45) Date of Patent: Mar. 31, 2020

(54) BRAKING DEVICE FOR VEHICLE

(71) Applicant: ADVICS CO., LTD., Kariya-shi, Aichi-ken (JP)

(72) Inventors: Masaki Maruyama, Nagoya (JP); Takahiro Yamaguchi, Kariya (JP); Koichi Kokubo, Nagoya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 3 days.

(21) Appl. No.: 16/078,265

(22) PCT Filed: Feb. 24, 2017

(86) PCT No.: PCT/JP2017/007032
§ 371 (c)(1),
(2) Date: Aug. 21, 2018

(87) PCT Pub. No.: WO2017/146194
PCT Pub. Date: Aug. 31, 2017

(65) Prior Publication Data
US 2019/0061532 A1 Feb. 28, 2019

(30) Foreign Application Priority Data
Feb. 26, 2016 (JP) .................. 2016-035649

(51) Int. Cl.
*B60T 13/66* (2006.01)
*B60L 7/26* (2006.01)
(Continued)

(52) U.S. Cl.
CPC ........ *B60L 7/26* (2013.01); *B60L 7/24* (2013.01); *B60L 15/2009* (2013.01);
(Continued)

(58) Field of Classification Search
CPC ..... B60L 7/18; B60L 7/26; B60T 8/17; B60T 8/72; B60T 8/171; B60T 8/442; B60T 13/586; B60T 13/662; B60T 13/686
(Continued)

(56) References Cited

U.S. PATENT DOCUMENTS

| 6,439,674 B1 | 8/2002 | Niino |
| 7,571,967 B2 * | 8/2009 | Saito ................. B60L 7/26 303/15 |

(Continued)

FOREIGN PATENT DOCUMENTS

| JP | 2001-071880 A | 3/2001 |
| JP | 2014-519436 A | 8/2014 |

OTHER PUBLICATIONS

International Search Report (PCT/ISA/210) dated May 23, 2017, by the Japanese Patent Office as the International Searching Authority for International Application No. PCT/JP2017/007032.
(Continued)

*Primary Examiner* — Christopher P Schwartz
(74) *Attorney, Agent, or Firm* — Buchanan Ingersoll & Rooney PC

(57) ABSTRACT

An electric braking device includes: a first valve unit for adjusting a first differential pressure between a master cylinder side liquid pressure and a wheel cylinder side liquid pressure; a storage unit forming a fluid storage chamber; second valve units for adjusting a second differential pressure between the master cylinder side liquid pressure and a storage chamber side liquid pressure; an electric pump for discharging the fluid in the storage chamber; and a control unit which, while operating the electric pump during a time from initiation of braking force application until a request value acquired by a request braking force acquiring unit reaches a maximum value, controls the first valve unit such that the first differential pressure becomes zero, and controls
(Continued)

the second valve units such that the second differential pressure becomes zero.

8 Claims, 7 Drawing Sheets

(51) Int. Cl.
| | |
|---|---|
| *B60T 8/40* | (2006.01) |
| *B60T 13/68* | (2006.01) |
| *B60T 8/17* | (2006.01) |
| *B60T 13/14* | (2006.01) |
| *B60T 7/04* | (2006.01) |
| *B60L 7/24* | (2006.01) |
| *B60L 15/20* | (2006.01) |
| *B60T 8/48* | (2006.01) |
| *B60T 8/171* | (2006.01) |
| *B60T 8/36* | (2006.01) |
| *B60T 8/72* | (2006.01) |

(52) U.S. Cl.
CPC ............... *B60T 7/042* (2013.01); *B60T 8/17* (2013.01); *B60T 8/171* (2013.01); *B60T 8/36* (2013.01); *B60T 8/40* (2013.01); *B60T 8/4081* (2013.01); *B60T 8/4872* (2013.01); *B60T 8/72* (2013.01); *B60T 13/146* (2013.01); *B60T 13/147* (2013.01); *B60T 13/148* (2013.01); *B60T 13/662* (2013.01); *B60T 13/68* (2013.01); *B60T 13/686* (2013.01); *B60L 2240/12* (2013.01); *B60L 2250/26* (2013.01); *B60T 2220/04* (2013.01); *B60T 2270/402* (2013.01); *B60T 2270/604* (2013.01)

(58) Field of Classification Search
USPC ............. 303/3, 15, 20, 152, 155; 701/70, 72
See application file for complete search history.

(56) References Cited

U.S. PATENT DOCUMENTS

| | | | |
|---|---|---|---|
| 9,233,668 B2* | 1/2016 | Ninoyu | B60T 8/4872 |
| 2006/0125317 A1* | 6/2006 | Kokubo | B60K 6/445 |
| | | | 303/152 |
| 2010/0105520 A1* | 4/2010 | Ohbayashi | B60K 6/48 |
| | | | 477/23 |
| 2012/0074767 A1* | 3/2012 | Nishio | B60T 1/10 |
| | | | 303/3 |
| 2013/0134767 A1* | 5/2013 | Hakiai | B60T 1/10 |
| | | | 303/3 |
| 2014/0152082 A1 | 6/2014 | Strengert et al. | |
| 2015/0352960 A1* | 12/2015 | Okano | B60T 8/172 |
| | | | 701/70 |
| 2016/0325628 A1* | 11/2016 | Okano | B60L 7/26 |
| 2019/0077386 A1* | 3/2019 | Kubota | B60T 8/17 |

OTHER PUBLICATIONS

Written Opinion (PCT/ISA/237) dated May 23, 2017, by the Japanese Patent Office as the International Searching Authority for International Application No. PCT/JP2017/007032.

\* cited by examiner

BRAKING DEVICE FOR VEHICLE

TECHNICAL FIELD

The present invention relates to a braking device for a vehicle provided with a liquid pressure braking device and a regenerative braking device.

BACKGROUND ART

A braking device for a vehicle that performs regenerative coordination is provided with a liquid pressure braking device which imparts a liquid pressure braking force, which corresponds to a liquid pressure in a wheel cylinder, to a wheel and a regenerative braking device which imparts a regenerative braking force, which is obtained by converting motion energy of the vehicle to electric energy, to the wheel. In the braking device for a vehicle, the regenerative braking force is sought to be generated as much as possible upon braking to obtain the electric energy. For example, suppression of generation of a liquid pressure braking force is performed by providing a mechanical configuration which generates an invalid stroke in response to a braking operation inside a master cylinder. A braking device for a vehicle which performs the regenerative coordination is described, for example, in JP 2001-71880 A.

CITATIONS LIST

Patent Literature

Patent Literature 1: JP 2001-71880 A

SUMMARY OF INVENTION

Technical Problems

In a braking device for a vehicle as above, an invalid stroke mechanism needs to be provided in a master cylinder, so that it structurally tends to become complicated. Further, from a viewpoint of causing a regenerative braking force as large as possible to be generated, there is a room for further improvements in the braking device for a vehicle.

The present invention has been made in view of the above circumstances, and aims to provide a braking device for a vehicle which can increase a ratio of a regenerative braking force in regenerative coordination without depending on a configuration of a master cylinder.

Solutions to Problems

A braking device for a vehicle of the present invention is a braking device for a vehicle provided with a liquid pressure braking device configured to impart a liquid pressure braking force, which corresponds to a liquid pressure in a wheel cylinder, to a wheel and a regenerative braking device configured to impart a regenerative braking force, which is obtained by converting motion energy of the vehicle to electric energy, to the wheel, the braking device for a vehicle including: a first valve unit provided in a first liquid pressure circuit connecting the wheel cylinder and a master cylinder, and configured to adjust a first differential pressure being a differential pressure between a liquid pressure on the master cylinder side and a liquid pressure on the wheel cylinder side; a storage unit forming a storage chamber for storing fluid; a second valve unit provided in a second liquid pressure circuit connecting the master cylinder and the storage chamber, and configured to adjust a second differential pressure being a differential pressure between a liquid pressure on the master cylinder side and a liquid pressure on the storage chamber side; an electric pump provided in a third liquid pressure circuit connecting a portion of the first liquid pressure circuit on the wheel cylinder side than the first valve unit and the storage chamber, and configured to discharge the fluid in the storage chamber to the portion of the first liquid pressure circuit on the wheel cylinder side than the first valve unit; a request braking force acquiring unit configured to acquire a request value of a braking force to be imparted to the wheel; a maximum regenerative braking force acquiring unit configured to acquire a maximum value of the regenerative braking force which can be imparted to the wheel by the regenerative braking device and which is dependent on a rotary speed of the wheel; and a control unit configured to drive the electric pump while controlling the first valve unit such that the first differential pressure becomes zero and controlling the second valve unit such that the second differential pressure becomes zero during a period since the braking force is started to be imparted to the wheel until the request value acquired by the request braking force acquiring unit reaches the maximum value acquired by the maximum regenerative braking force acquiring unit.

Advantageous Effects of Invention

According to the present invention, after the braking force has started to be imparted, the second liquid pressure circuit comes to be in a communicated state, and the fluid that has flown out from the master cylinder by a braking operation flows into the storage chamber through the second liquid pressure circuit. Due to this, a fluid amount that flows into the wheel cylinder at a beginning of the braking operation is suppressed, generation of an initial liquid pressure braking force is suppressed, by which the braking force distributed by the regenerative braking force becomes larger. That is, according to the present invention, the regenerative braking force can be generated at maximum by suppressing the generation of the liquid pressure braking force at a beginning of imparting the braking force. Further, this effect is achieved by the control of the second valve unit and the like, and is not dependent on a configuration of the master cylinder.

DESCRIPTION OF EMBODIMENTS

Figure 1:
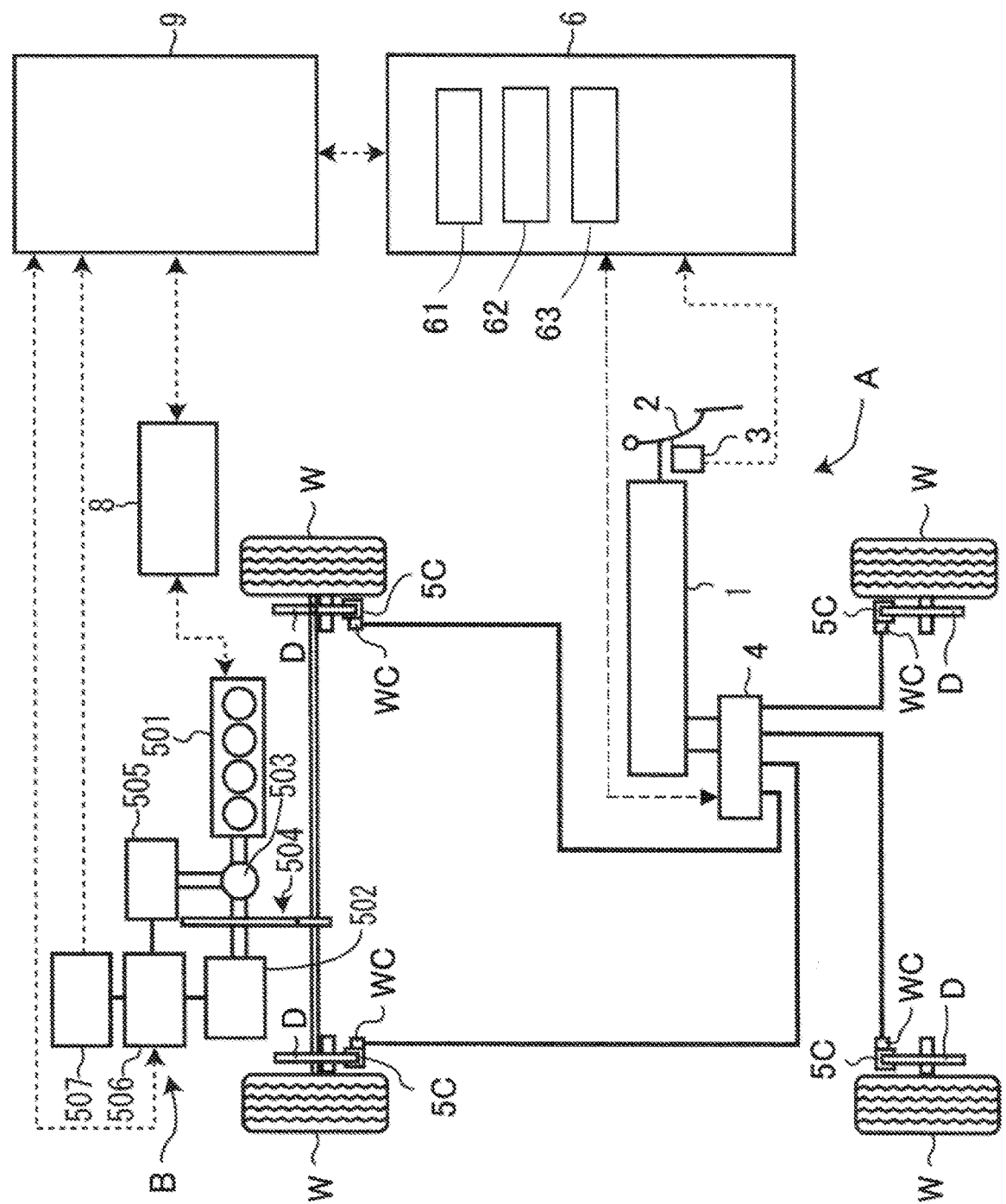
FIG. 1 is a conceptual diagram illustrating a schematic configuration of a vehicle of a first embodiment.

Embodiments of the present invention will be described hereinbelow with reference to the drawings. A hybrid vehicle (hereinbelow may simply be abbreviated as a vehicle) in which a braking device for a vehicle of a first embodiment is installed is a vehicle which causes drive wheels, for example, left and right front wheels W, to be driven by a hybrid system. As illustrated in FIG. 1, the vehicle is provided with a liquid pressure braking device A, a regenerative braking device B, an engine ECU 8, an engine 501, a power division mechanism 503, and a power transfer mechanism 504.

The braking device for a vehicle of the first embodiment is provided with the liquid pressure braking device A configured to impart a liquid pressure braking force, which corresponds to liquid pressures in wheel cylinders WC, to wheels W, and a regenerative braking device B configured to impart a regenerative braking force, which is obtained by converting motion energy of the vehicle to electric energy, to the wheels W. The liquid pressure braking device A includes a master cylinder 1, a reservoir 17, a brake pedal 2, a stroke sensor 3, a liquid pressure adjustment unit 4, the wheel cylinders WC, friction brake mechanisms 5C, and a brake ECU 6. The regenerative braking device B includes a hybrid ECU 9, a generator 505, an inverter 506, and a battery 507. Details of the liquid pressure braking device A and the regenerative braking device B will be described later.

Driving power of the engine 501 is transferred to driving wheels through the power division mechanism 503 and the power transfer mechanism 504. Driving power of the motor 502 is transferred to the driving wheels through the power transfer mechanism 504. The inverter 506 is configured to convert a voltage between the motor 502 as well as the generator 505 and the battery 507 as a DC power source. The engine ECU 8 adjusts the driving power of the engine 501 based on an instruction from the hybrid ECU 9. The hybrid ECU 9 is configured to control the motor 502 and the generator 505 via the inverter 506. The hybrid ECU 9 is connected to the battery 507, and it is configured to monitor a charged state and charged current of the battery 507.

The regenerative braking device B is configured to cause a regenerative braking force to be generated by the generator 505 in wheels Wfl, Wfr based on a "target regenerative braking force" to be described later. In the embodiment illustrated in FIG. 1, the motor 502 and the generator 505 are separate members; however, they may be a motor generator in which a motor and a generator are integrated.

The friction brake mechanism 5C is provided at a position adjacent to each wheel W, and includes a brake disk D configured to rotate integrally with the corresponding wheel W, and brake pads (not shown) for the brake disk D. Each wheel cylinder WC is configured to generate a liquid pressure (wheel pressure) based on a master pressure generated in the master cylinder 1, and causes a frictional braking force to be generated by pressing the brake pads against the brake disk D.

The stroke sensor 3 is configured to detect an operation amount (stroke amount) of the brake pedal 2 and to output a detected signal thereof to the brake ECU 6. The brake ECU 6 calculates a driver's "request braking force" based on the detection signal from the stroke sensor 3. The request braking force is a total amount of the braking force to be imparted to the wheels W according to the braking operation (operation amount and operation speed thereof).

The brake ECU 6 is configured to determine whether regenerative brake can be operated or not based on an electricity charge state, a motor state, an electric conduction state, and the like, and in a case of determining that the regenerative brake can be operated, it sends a first request braking force (corresponds to a request value) as the "target regenerative braking force" to the hybrid ECU 9 in principle. The first request braking force is a value that subtracted, for example, a liquid pressure braking force that is mechanically generated at a beginning of the operation (hereinbelow may be denoted as an initial liquid pressure braking force) from the request braking force corresponding to the braking operation. The initial liquid pressure braking force may be acquired based on the master pressure generated by the braking operation and/or an estimated value, a measured value, or a set value of the wheel pressure. Although it will be described later, in the present embodiment, the initial liquid pressure braking force can be brought to zero without depending on a configuration of the master cylinder 1.

The hybrid ECU 9 performs regenerative control based on the target regenerative braking force, detects (calculates) the regenerative braking force at this timing, and sends the detected regenerative braking force as an "executing regenerative braking force" to the brake ECU 6. The brake ECU 6 sets a difference between the first request braking force and the executing regenerative braking force as a "target liquid pressure braking force", and controls the liquid pressure adjustment unit 4 based on the target liquid pressure braking force.

(Liquid Pressure Braking Device)

Figure 2:
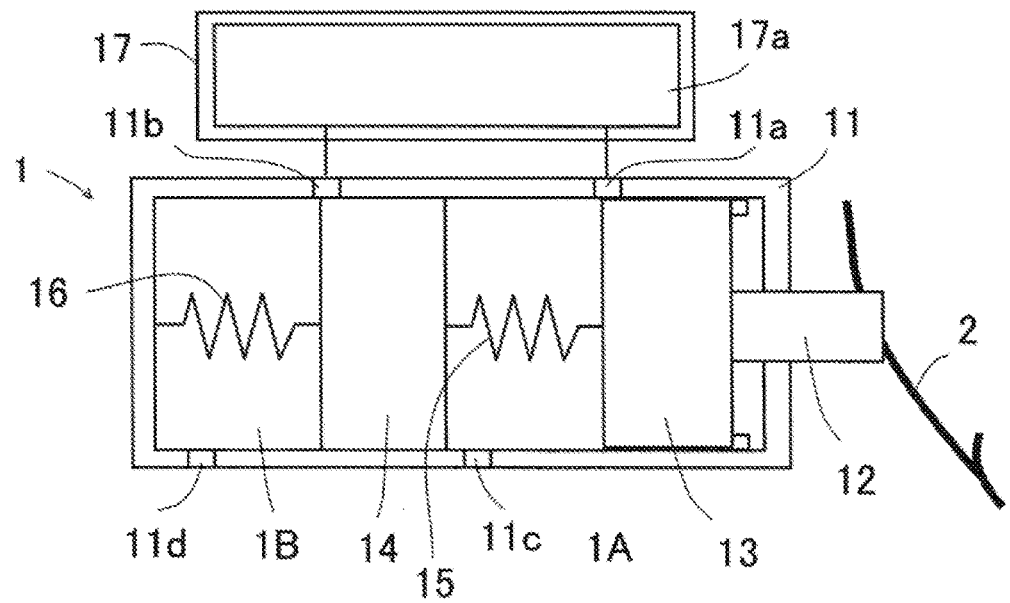
FIG. 2 is a conceptual diagram illustrating a schematic configuration of a master cylinder of the first embodiment.

The master cylinder 1 is a portion that supplies fluid (operation fluid) to the liquid pressure adjustment unit 4 in accordance with the operation amount of the brake pedal (brake operating member) 2, and as illustrated in FIG. 2, it is provided with an input piston 11, a cylinder portion 12, a first master piston 13, a second master piston 14, and springs 15, 16. The brake pedal 2 simply needs to be a braking operation means with which the driver can perform the braking operation. Since a configuration of the master cylinder 1 is well known, it will briefly be described.

The input piston 11 is a member that is connected to the brake pedal 2 and progresses according to a stepping amount on the brake pedal 2. The cylinder portion 12 is a bottomed cylindrical member having a bottom surface on its front side. The first master piston 13 is arranged in a liquid-tight manner so as to be slidable in a front and back direction in the cylinder portion 12. The first master piston 13 is connected directly or indirectly to the input piston 11, and progresses in accordance with the progression of the input piston 11.

The second master piston 14 is arranged in a liquid-tight manner so as to be slidable in the front and back direction in the cylinder portion 12 in front of the first master piston 13. The spring 15 is arranged between the first master piston 13 and the second master piston 14, and biases the first master piston 13 backward. The spring 16 is arranged between the second master piston 14 and the bottom surface of the cylinder portion 12, and biases the second master piston 13 backward.

A first master chamber 1A is formed (defined) by an inner circumferential surface of the cylinder portion 11, the first master piston 13, and the second master piston 14. Further, a second master chamber 1B is formed by the inner circumferential surface and the bottom surface of the cylinder portion 11 and the second master piston 14. The first master chamber 1A is connected to one system (first pipe system 40 to be described later) of the liquid pressure adjustment unit 4 through a pipe 41. The second master chamber 1B is connected to another system (second pipe system 50 to be described later) of the liquid pressure adjustment unit 4 through a pipe 51. The master chambers 1A, 1B are connected to the wheel cylinders WC through the liquid pressure adjustment unit 4. The cylinder portion 11 has formed thereon a port 11c to which the pipe 41 is connected and a port 11d to which the pipe 51 is connected.

The reservoir 17 is for storing the fluid, and supplies the fluid to the cylinder portion 11. The reservoir 17 forms a storage chamber 17a that stores the fluid therein. The reservoir 17 is an air pressure reservoir (tank) of which inside is open to air, and is configured to be capable of supplying the fluid to the master cylinder 1 by gravity.

The reservoir 17 is connected to the ports 11a and 11b of the cylinder portion 11. Specifically, the cylinder portion 11 is provided with the port 11a which opens and closes according to progression and regression of the first master piston 13, and the port 11b which opens and closes according to progression and regression of the second master piston 14. The port 11a is formed such that it opens in a case where the first master piston 13 is at an initial position to cause the first master chamber 1A and the reservoir 17 to communicate with each other, and is closed by the first master piston 13 when the first master piston 13 progresses to cut off the first master chamber 1A from the reservoir 17. Similarly, the port 11b is formed such that it opens in a case where the second master piston 14 is at an initial position to cause the second master chamber 1B and the reservoir 17 to communicate with each other, and is closed by the second master piston 14 when the second master piston 14 progresses to cut off the second master chamber 1B from the reservoir 17.

Figure 3:
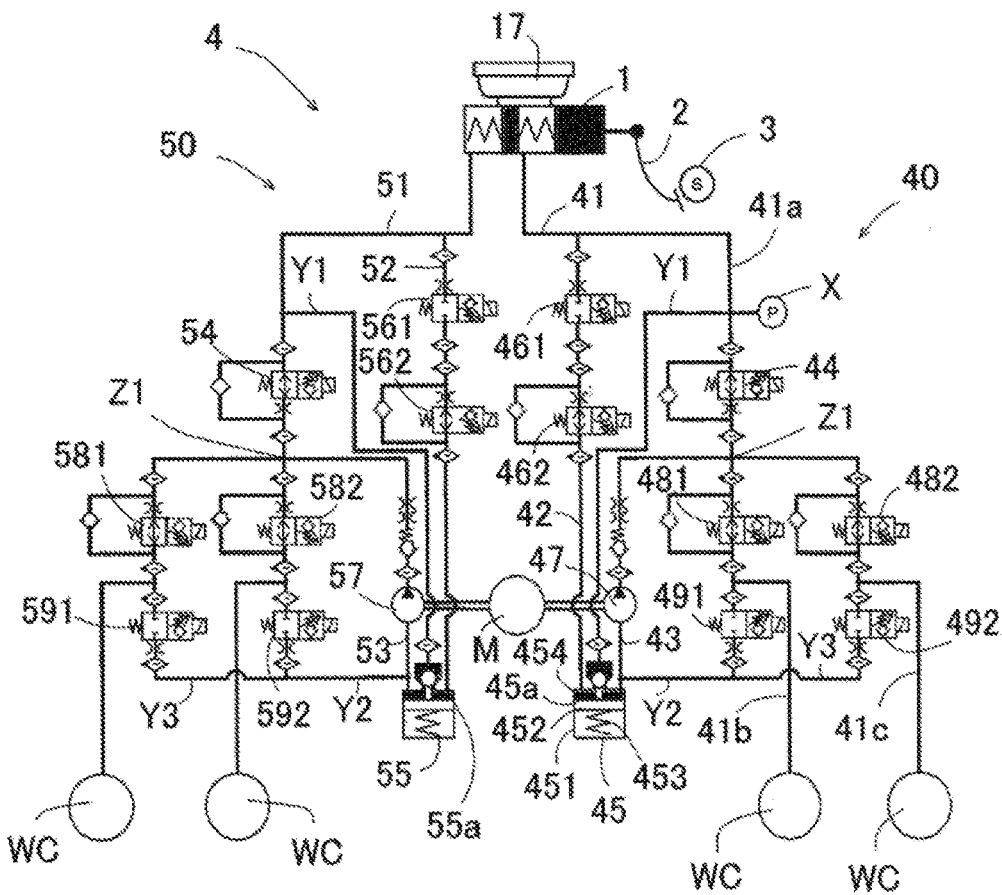
FIG. 3 is a configuration diagram illustrating a configuration of a braking device for a vehicle of the first embodiment.

The liquid pressure adjustment unit 4 is a device that adjusts a braking liquid pressure to be imparted to each wheel cylinder WC. The liquid pressure adjustment unit 4 is an actuator provided between the master cylinder 1 and the wheel cylinders WC. As illustrated in FIG. 3, the liquid pressure adjustment unit 4 is provided with the first pipe system 40 and the second pipe system 50. For example, the first pipe system 40 controls the wheel pressures applied to the wheel cylinders WC of the left front wheel W and the right rear wheel W, and the second pipe system 50 controls the wheel pressures applied to the wheel cylinders WC of the right front wheel W and the left rear wheel W. Combinations of the wheel cylinders WC to which the respective pipe systems 40, 50 are connected are not limited to the above.

The first pipe system 40 is provided with the first pipe 41, the second pipe 42, a third pipe 43, a first differential pressure control valve 44, a reservoir 45, an electromagnetic valve 461, a second differential pressure control valve 462, an electric pump 47, pressure boosting valves 481, 482, and pressure reducing valves 491, 492.

The first pipe (corresponding to "first liquid pressure circuit") 41 is a passage forming member that connects the master cylinder 1 (first master chamber 1A) and the wheel cylinders WC. The first pipe 41 includes a branching point Z1 in the middle thereof that branches it into two passages, and is configured of a pipe portion 41a that connects the master cylinder 1 and the branching point Z1, and pipe portions 41b, 41c from the branching point Z1 to the wheel cylinders WC.

The second pipe (corresponding to "second liquid pressure circuit") 42 is a passage forming member that connects the master cylinder 1 (first master chamber 1A) and the reservoir 45. The second pipe 42 of the first embodiment connects the master cylinder 1 and the reservoir 45 via a portion of the pipe portion 41a on the master cylinder 1 side than the first differential pressure control valve 44.

The third pipe (corresponding to "third liquid pressure circuit") 43 is a passage forming member that connects a portion of the first pipe 41 on the wheel cylinder WC side than the first differential pressure control valve 44, the portion being between the first differential pressure control valve 44 and the pressure boosting valves 481, 482, to the reservoir 45. The third pipe 43 of the first embodiment connects the branching point Z1 and the reservoir 45.

The first pipe system 40 is further provided with a pipe Y1 that connects a portion of the pipe portion 41a on the master cylinder 1 side than the first differential pressure control valve 44 to the reservoir 45, a pipe Y2 that connects a portion of the pipe portion 41b on the wheel cylinder WC side than the pressure boosting valve 481 to the reservoir 45, and a pipe Y3 that connects a portion of the pipe portion 41c on the wheel cylinder WC side than the pressure boosting valve 482 to the reservoir 45. Further, the first pipe system 40 is provided with a pressure sensor X that detects a pressure on the portion of the first pipe 41 on the master cylinder 1 side than the first differential pressure control valve 44. In the explanation of the first embodiment, a "pipe" means the same even if, for example, a passage, an oil path, or a liquid pressure circuit is substituted for this.

The first differential pressure control valve (corresponding to "first valve unit") 44 is provided on the pipe portion 41a of the first pipe 41, and is an electromagnetic valve that adjusts a "first differential pressure" being a differential pressure between a liquid pressure on the master cylinder 1 side and a liquid pressure on the wheel cylinder WC side. The first differential pressure control valve 44 functions as a linear valve that linearly controls the differential pressure generated between upstream and downstream. The first differential pressure control valve 44 is configured of a normally-open electromagnetic valve that can control communicated and cut-off states, and an interval between a valve body and a valve pedestal is controlled by adjusting a current value flown in its solenoid, by which a throttle effect generated between the valve body and the valve pedestal changes. Since the differential pressure corresponding to this throttle effect is maintained, the brake ECU 6 can cause the first differential pressure control valve 44 to function as the linear valve.

The first differential pressure control valve 44 is configured such that the first differential pressure becomes zero when supplied control current is zero (upon an electrically non-conducted state), and the throttle effect increases as the supplied control current increases. As above, the brake ECU 6 controls the first differential pressure control valve 44 to linearly control the differential pressure between the liquid pressure on the master cylinder 1 side and the liquid pressure on the wheel cylinder WC side with respect to an installed position.

The reservoir (corresponding to "storage unit") 45 is a member that stores the fluid, and forms the storage chamber 45*a* that stores the fluid therein. As an example, the reservoir 45 is provided with a bottomed cylindrical container portion 451, a piston portion 452 arranged slidably in the container portion 451, a spring portion 453 arranged between a bottom surface of the container portion 451 and the piston portion 452 and capable of biasing the piston portion 452 toward an opening side of the container portion 451, and a lid portion 454 that closes the opening of the container portion 451. The storage chamber 45*a* is formed (defined) by the container portion 451, the piston portion 452, and the lid portion 454.

The reservoir 45 of the first embodiment is a reservoir that is generally used in an actuator for an ABS or a sideslip prevention device (for example, an ABS reservoir), and is configured so that a prescribed activation pressure being an initial pressure is generated in the storage chamber 45*a* as a countermeasure for an operation during cold time periods. "Each pipe being connected to the reservoir 45" in this description means that "each pipe is connected to the storage chamber 45*a*". Further, the lid portion 454 and the pipe Y1 are configured to allow the fluid to flow between the storage chamber 45*a* and the pipe portion 41*a* in a case where a pressure in the storage chamber 45*a* is higher than a pressure in the pipe portion 41*a*, and to prohibit such flow in other cases.

The electromagnetic valve (corresponding to "first electromagnetic valve") 461 is a normally-closed electromagnetic valve provided on the second pipe 42. The electromagnetic valve 461 is configured of a two-position electromagnetic valve that can control communicated and cut-off states. The electromagnetic valve 461 closes during the electrically non-conducted state, and opens during an electrically conducted state of valve-opening current.

The second differential pressure control valve (corresponding to "second electromagnetic valve") 462 is provided between the electromagnetic valve 461 of the second pipe 42 and the reservoir 45, and is an electromagnetic valve that adjusts a "second differential pressure" being a differential pressure between a liquid pressure on the master cylinder 1 side and a liquid pressure on the reservoir 45 (storage chamber 45*a*) side. The second differential pressure control valve 462 has a same configuration as the first differential pressure control valve 44, is a normally-open type, and functions as a linear valve. That is, the second differential pressure control valve 462 is configured such that the second differential pressure becomes zero when supplied control current is zero (upon the electrically non-conducted state), and its throttle effect increases as the supplied control current increases. As above, the brake ECU 6 controls the second differential pressure control valve 462 to linearly control the differential pressure between the liquid pressure on the master cylinder 1 side and the liquid pressure on the reservoir 45 side with respect to an installed position. The electromagnetic valve 461 and the second differential pressure control valve 462 correspond to "second valve unit".

The electric pump 47 is a pump provided with a motor M, and that is driven by the motor M. The electric pump 47 is provided on the third pipe 43, and when it is driven, it discharges the fluid in the storage chamber 45*a* to the portion of the first pipe 41 on the wheel cylinder WC side than the first differential pressure control valve 44, which is the portion between the first differential pressure control valve 44 and the pressure boosting valves 481, 482 (here, the branching point Z1). The brake ECU 6 controls the drive of the electric pump 47.

The electric pump 47 suctions the fluid from the reservoir 45 and discharges the same to the branching point Z1 to supply the fluid to the wheel cylinder WC side. In a case where the electromagnetic valve 461 and the second differential pressure control valve 462 are in the communicated states and the electric pump 47 is driven, the fluid is suctioned to the wheel cylinder WC side from the master cylinder 1 via the reservoir 45. The brake ECU 6 can set the first differential pressure control valve 44 to a throttling state (differential pressure generating state) and cause the electric pump 47 to be driven to apply pressure to the wheel cylinders WC.

The pressure boosting valves 481, 482 are electromagnetic valves provided between the master cylinder 1 and the wheel cylinders WC, and that open and close the liquid pressure circuits for causing the fluid on the master cylinder 1 side to flow into the wheel cylinders WC. Specifically, the pressure boosting valve 481 is a normally-open electromagnetic valve provided in the pipe portion 41*b* of the first pipe 41, and that communicates and cuts off the passage formed by the pipe portion 41*b*. The pressure boosting valve 482 is a normally-open electromagnetic valve provided in the pipe portion 41*c* of the first pipe 41, and that communicates and cuts off the passage formed by the pipe portion 41*c*.

The pressure reducing valves 491, 492 are electromagnetic valves provided between the wheel cylinders WC and the reservoir 45, and that open and close the liquid pressure circuits for causing the fluid in the wheel cylinders WC to flow to the reservoir 45 side. Specifically, the pressure reducing valve 491 is a normally-closed electromagnetic valve provided in the pipe Y2, and that communicates and cuts off the passage formed by the pipe Y2. The pressure reducing valve 492 is a normally-closed electromagnetic valve provided in the pipe Y3, and that communicates and cuts off the passage formed by the pipe Y3.

The second pipe system 50 is provided with the first pipe 51, a second pipe 52, a third pipe 53, a first differential pressure control valve 54, a reservoir 55, an electromagnetic valve 561, a second differential pressure control valve 562, an electric pump 57, pressure boosting valves 581, 582, and pressure reducing valves 591, 592. In the first embodiment, since the second pipe system 50 has a same configuration as the first pipe system 40, the explanation of the second pipe system 50 will be omitted by giving the same names as the first pipe system 40.

The brake ECU 6 and the hybrid ECU 9 are electronic control units that include CPUs and memories. The brake ECU 6 controls the liquid pressure adjustment unit 4 based on information from various sensors and information from the hybrid ECU 9. Controls which the brake ECU 6 performs on the liquid pressure adjustment unit 4 are pressure reducing control, retaining control, pressure increasing control, and pressure applying control. These controls will be described by taking the first pipe system 40 as an example.

In the pressure reducing control, for example, the brake ECU 6 sets the first differential pressure control valve 44 in the communicated state (first differential pressure=0), the electromagnetic valve 461 in the communicated state, the second differential pressure control valve 462 in the communicated state (second differential pressure=0), the pressure boosting valves 481, 482 in the cut-off states, the pressure reducing valves 491, 492 in the communicated states, and causes the electric pump 45 to be driven. In the retaining control, for example, the brake ECU 6 sets the first differential pressure control valve 44 in a non-throttled communicated state (first differential pressure=0), the pressure boosting valves 481, 482 in the cut-off states, and the pressure reducing valves 491, 492 in the cut-off states. The pressure increasing control is a control that supplies the fluid of the master cylinder 1 to the wheel cylinders WC without driving the electric pump 47. The pressure applying control is a control that drives the electric pump 47 and causes the first differential pressure (#0) to be generated by the first differential pressure control valve 44.

Here, the pressure increasing control and the pressure applying control in regenerative coordination in the first embodiment will be described. When the braking operation is started, the brake ECU 6 sets the pressure boosting valves 481, 482 in the opened states and the pressure reducing valves 491, 492 in the closed state to enable execution of the pressure increasing control or the pressure applying control.

Figure 4:
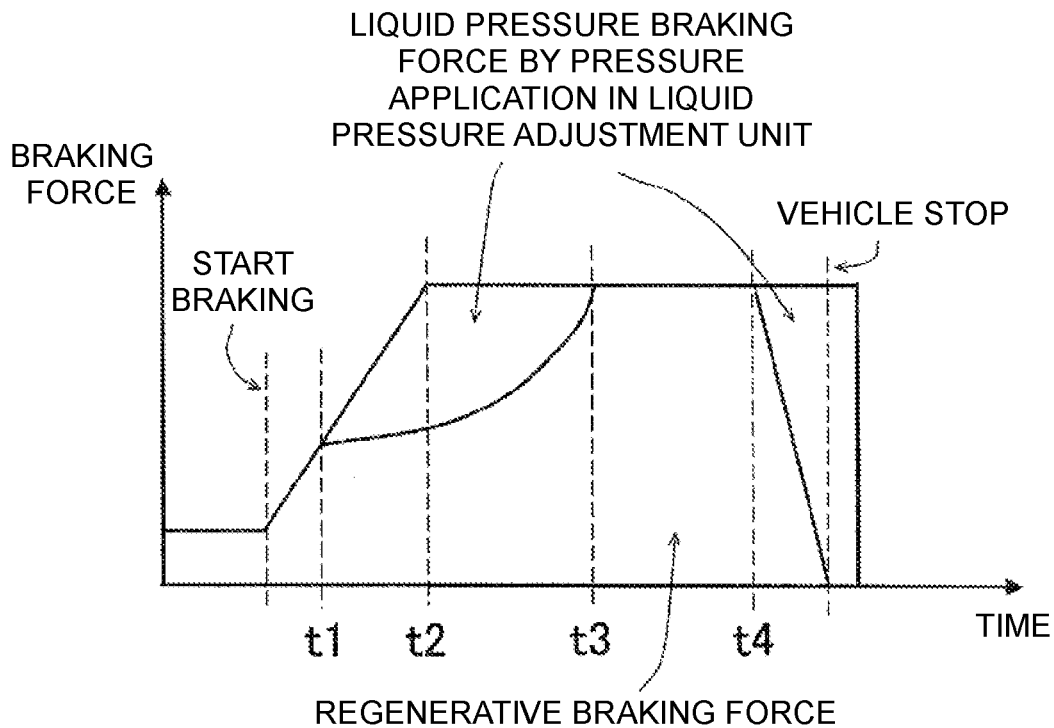
FIG. 4 is an explanatory diagram for explaining regenerative coordination of the first embodiment.
Figure 5:
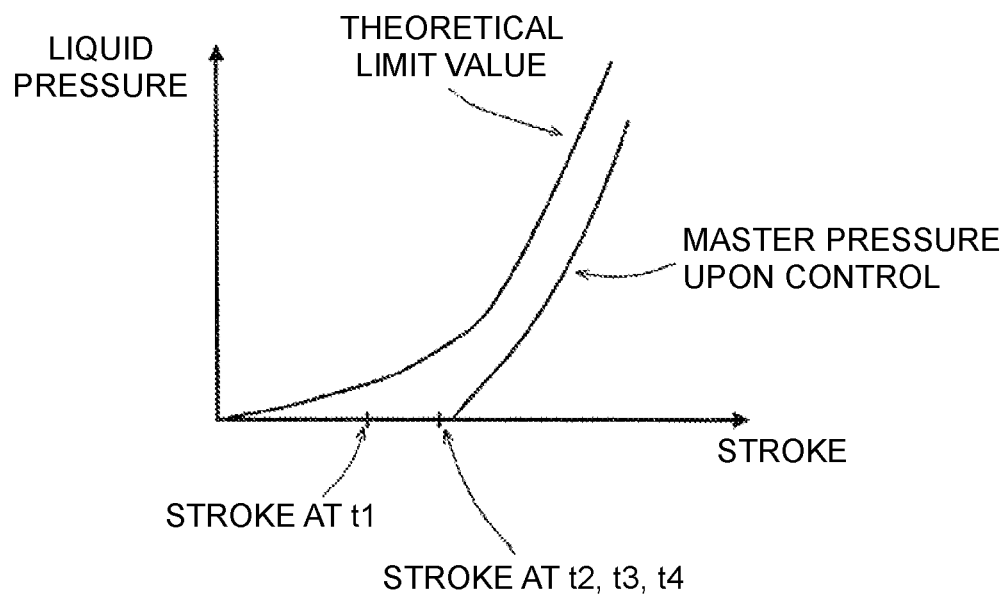
FIG. 5 is an explanatory diagram for explaining the regenerative coordination of the first embodiment.

As illustrated in FIGS. 4 and 5, in a case where the first request braking force does not exceed a maximum regenerative braking force in a middle speed range, the liquid pressure braking force by the liquid pressure of the master cylinder 1 (hereinbelow termed a master pressure) is not generated. The maximum regenerative braking force is a maximum value of the regenerative braking force which can be imparted to the wheels W by the regenerative braking device B, and which is dependent on rotary speeds of the wheels W. The maximum regenerative braking force is an executing regenerative braking force which is actually output.

A relationship between the rotary speeds of the wheels W (that is, a vehicle speed) and the maximum regenerative braking force (herein a maximum value of an executing regenerative braking force) is represented by a maximum torque characteristic, and normally the maximum regenerative braking force becomes a constant value in the middle speed range (corresponding to "limit value" and "prescribed threshold"), drops relatively acutely from the constant value toward a low-speed side in a low speed range, and drops relatively moderately from the constant value toward a high-speed side in a high speed range. That is, the maximum regenerative braking force takes a highest value and becomes constant in the middle speed range. A limit value of the regenerative force output by the regenerative braking device B is a maximum value of the executing regenerative braking force in the middle speed range. Further, a theoretical limit value theoretically calculates an amount of the wheel pressure that is generated per stroke (or a changing amount of a volume of the first master chamber 1A, for example) according to the configurations of the master cylinder 1 and the wheel cylinders WC.

The brake ECU 6 is provided with a request braking force acquiring unit 61 that acquires the request value of the braking force to be imparted to the wheels W, a maximum regenerative braking force acquiring unit 62 that acquires the maximum regenerative braking force, and a control unit 63 that controls the liquid pressure adjustment unit 4, as its functions.

Basically, when the braking operation is started (starting the braking), the control unit 63 shifts the electromagnetic valve 461 from the closed state to the opened state, controls the second differential pressure control valve 462 such that the second differential pressure becomes zero, that is, in the non-throttling communicated state (electrically non-conducted state), and causes the electric pump 47 to be driven. That is, the control unit 63 causes the electric pump 47 with the second pipe 42 in the communicated state to be driven. In so doing, the fluid that has flown into the liquid pressure adjustment unit 4 from the master cylinder 1 by the braking operation flows into the reservoir 45 through the second pipe 42. That is, at this occasion, the fluid that has flown out from the master cylinder 1 is not supplied to the wheel cylinders WC, and thus the braking operation (master pressure) is not reflected in the wheel pressures. Thus, at this occasion, the liquid pressure braking force by the master pressure is not generated. Before the braking operation is started, the electromagnetic valve 461 is in the closed state (electrically non-conducted state), and the second pipe 42 is thereby cut off.

The request braking force acquiring unit 61 acquires the first request braking force corresponding to the braking operation (for example, calculates and acquires the same or acquires the same from a map or the like), and sends the first request braking force as the target regenerative braking force to the hybrid ECU 9. The hybrid ECU 9 performs regenerative control based on the target regenerative braking force, and sends the calculated executing regenerative braking force to the brake ECU 6. The control unit 63 sets a difference between the first request braking force and the executing regenerative braking force (corresponding to "first prescribed value") as the target liquid pressure braking force. The control unit 63 controls the liquid pressure adjustment unit 4 based on the target liquid pressure braking force such that the target liquid pressure braking force is achieved. The control unit 63 performs the pressure applying control using the electric pump 47 by taking the state of the second pipe 42, that is, the control states of the electromagnetic valve 461 and the second differential pressure control valve 462 into consideration. Until t1, the pressure applying control is not performed since the first request braking force is equal to or less than the maximum regenerative braking force.

From t1 to t2, the control unit 63 performs the pressure applying control since the first request braking force has exceeded the maximum regenerative braking force. That is, the control unit 63 supplies the control current to the first differential pressure control valve 44 from the control state from the start of the braking to t1 to generate the throttle effect in the first differential pressure control valve 44, and brings the first differential pressure to be greater than zero. The control unit 44 determines the first differential pressure to be generated based on the target liquid pressure braking force. In t1 to t2, the electric pump 47 is driven by which the fluid is supplied from the master cylinder 1 to the branching point Z1 through the second pipe 42 and the reservoir 45 in the communicated state. The fluid flows from the branching point Z1 toward the wheel cylinder WC side and the master cylinder side. Circulation of the fluid by the electric pump 47 and the throttling of the first differential pressure control valve 44 generates the first differential pressure, by which the wheel cylinders WC are pressurized.

Further, by the braking operation until t1, the fluid is stored at a greater amount upon t1 than what initially was stored in the reservoir 45 (storage chamber 45a). Due to this, the fluid is suctioned from the reservoir 45 having the increased fluid amount when the pressure applying control is started, and an influence on the braking operation caused by the suction from the master cylinder 1 (for example, sinking of the brake pedal 2) is suppressed.

In t2 to t3, the control unit 63 continues the above control. In t2 to t3, the maximum regenerative braking force gradually becomes larger as the vehicle speed decelerates in the high speed range, and since the first request braking force is in a constant state, the target liquid pressure braking force gradually becomes smaller. In response to this, the control unit 63 controls the first differential pressure control valve 44 such that the first differential pressure gradually becomes smaller.

At t3, the first request braking force becomes equal to or less than the maximum regenerative braking force, and the control unit 63 brings the first differential pressure control valve 44 to be in the electrically non-conducted state (non-throttled communicated state) and the first differential pressure to zero. By this control, in t3 to t4, the fluid flows out from the wheel cylinders WC and the reservoir 45 by driving the electric pump 47, and flows into the reservoir 45 through the first differential pressure control valve 44, the electromagnetic valve 461, and the second differential pressure control valve 462. Due to this, the wheel pressures drop, the liquid pressure braking forces no longer are generated, and the first request braking force is realized solely by the regenerative braking force.

From t4 and thereafter, the vehicle speed enters the low-speed range and the maximum regenerative braking force decreases, and thus, the control unit 63 again performs the pressure applying control, which is a so-called swap control. The control unit 63 increases the throttling of the first differential pressure control valve 44 according to the increase in the target liquid pressure braking force to increase the first differential pressure. Further, the regenerative braking force becomes zero by the vehicle coming to stop. The control unit 63 stops the electric pump 47 after the vehicle has stopped, and performs the retaining control. The electric pump 47 is driven from the start of the braking until the stop of the vehicle.

Figure 6:
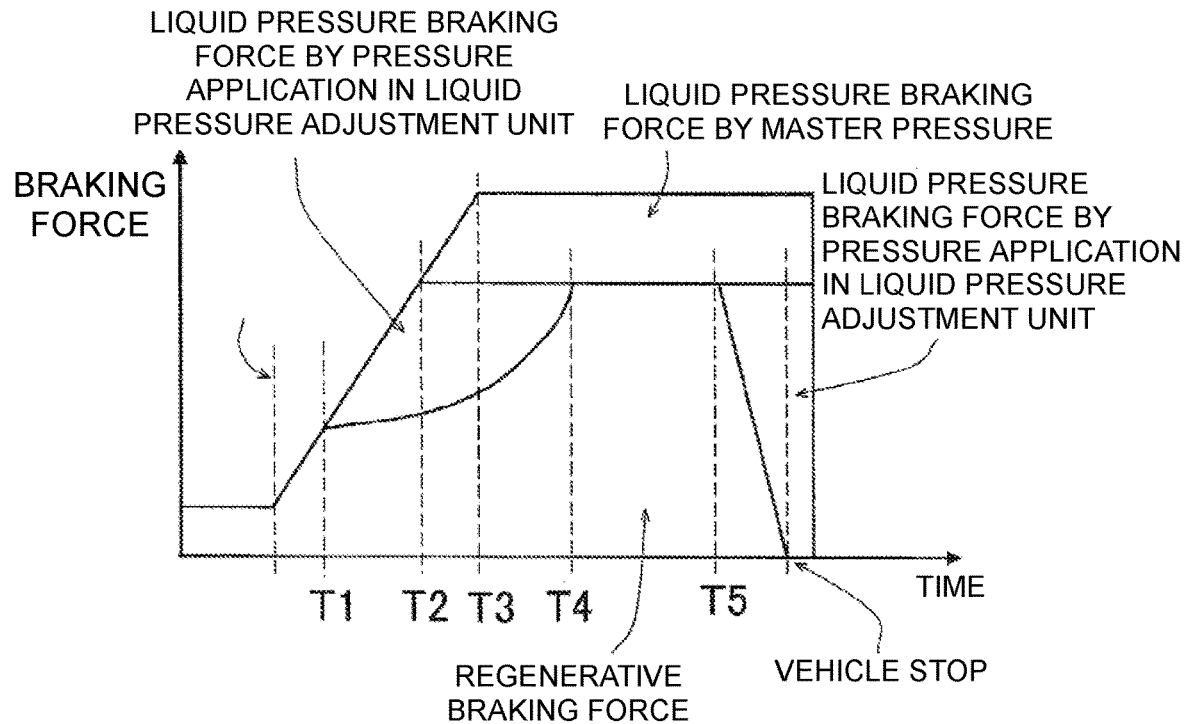
FIG. 6 is an explanatory diagram for explaining the regenerative coordination of the first embodiment.
Figure 7:
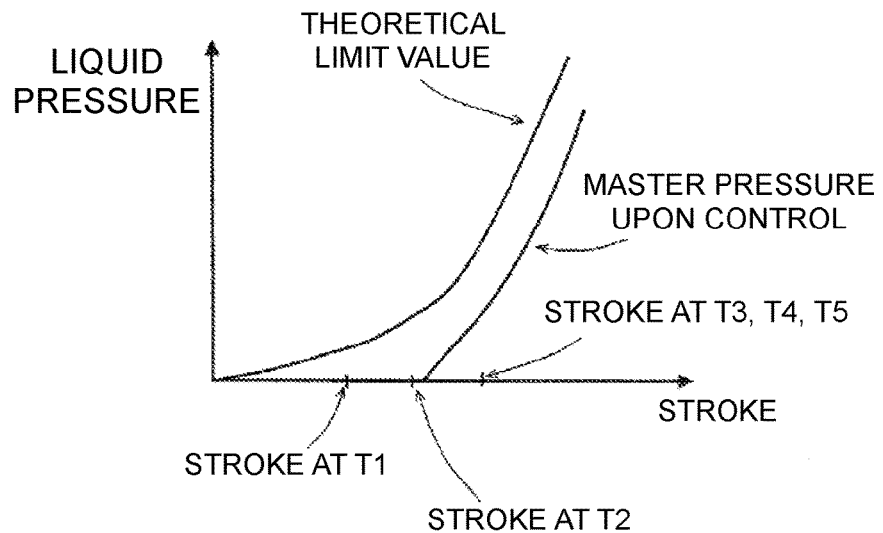
FIG. 7 is an explanatory diagram for explaining the regenerative coordination of the first embodiment.

Further, as illustrated in FIGS. 6 and 7, in a case where the first request braking force exceeds the maximum regenerative braking force in the middle speed range, the control unit 63 causes the liquid pressure braking force to be generated by the pressure application of the master pressure. Specifically, firstly the control same as that from the start of the braking to t1 is performed from the start of the braking to T1, and the control same as that of the above t1 to t2 is performed in T1 to T2.

From T2 and thereafter, since the first request braking force exceeds the maximum regenerative braking force in the middle speed range, the control unit 63 further throttles the second differential pressure control valve 462 to increase the second differential pressure from zero, in addition to the pressure application by the first differential pressure. The control unit 63 causes the fluid to circulate by the flow from the reservoir 45 to the first differential pressure control valve 44, the electromagnetic valve 461, the second differential pressure control valve 462, and the reservoir 45 by driving the electric pump 47 while it generates the throttle effect in the second differential pressure control valve 462. Due to this, the second differential pressure (#0) is generated, and the master pressure increases. When the master pressure increases, the wheel pressures increase based on the first differential pressure, and the liquid pressure braking forces thereby increase.

In T4 to T5, the control unit 63 brings the first differential pressure control valve 44 to be in the non-throttled communicated state (first differential pressure being zero), brings only the second differential pressure control valve 462 to be in the throttled state, and continues to circulate the fluid by the electric pump 47. From T5 and thereafter, the control unit 63 increases the first differential pressure from zero again while the second differential pressure (#0) is being generated, and performs the swap control. The control unit 63 stops the electric pump 47 after the vehicle has stopped, and performs the retaining control. The electric pump 47 is driven from the start of the braking until the stop of the vehicle.

As above, the control unit 63 controls the first differential pressure control valve 44 such that the first differential pressure becomes zero and controls the second differential pressure control valve 462 such that the second differential pressure becomes zero while driving the electric pump 47 during a period (from the start of the braking to t1 or T1) since the braking force is started to be imparted to the wheels W (since braking determination is ON) until the first request braking force (request value) acquired by the request braking force acquiring unit 61 exceeds the maximum regenerative braking force (maximum value) acquired by the maximum regenerative braking force acquiring unit 62. The braking determination is performed by the brake ECU 6 when the stroke is small, that is, immediately after the braking operation is started. At this occasion, the brake ECU 6 calculates the speed of the braking operation (operation speed), that is, a stepping speed of the brake pedal 2. Braking start means that the braking determination determines ON (with braking).

Further, in a case where the first request braking force acquired by the request braking force acquiring unit 61 is greater than the maximum regenerative braking force acquired by the maximum regenerative braking force acquiring unit 62 and the first request braking force acquired by the request braking force acquiring unit 61 is equal to or less than a prescribed threshold (t1 to t2, t4 and thereafter, or T1 to T2), the control unit 63 controls the first differential pressure control valve 44 such that the first differential pressure becomes a first prescribed value and controls the second differential pressure control valve 462 such that the second differential pressure becomes zero while driving the electric pump 47. Here, the first prescribed value is a differential pressure value (a value converted a braking force to a differential pressure) based on a value that is obtained by subtracting the maximum regenerative braking force acquired by the maximum regenerative braking force acquiring unit 62 from the first request braking force acquired by the request braking force acquiring unit 61. The prescribed threshold is a limit value of the regenerative braking force that can be imparted to the wheels W by the regenerative braking device B and that does not depend on the rotary speeds of the wheels W. The prescribed threshold is set to the maximum value of the executing regenerative braking force in the middle speed range.

Further, in a case where the request braking force acquired by the request braking force acquiring unit 61 is greater than the prescribed threshold (T2 and thereafter), the control unit 63 controls the first differential pressure control valve 44 such that the first differential pressure becomes a second prescribed value and controls the second differential pressure control valve 462 such that the second differential pressure becomes a third prescribed value while driving the electric pump 47. Here, the second prescribed value is a differential pressure value based on a value that is obtained by subtracting the maximum regenerative braking force acquired by the maximum regenerative braking force acquiring unit 62 from the prescribed threshold. The third prescribed value is a differential pressure value based on a value that is obtained by subtracting the prescribed threshold from the first request braking force acquired by the request braking force acquiring unit 61.

Here, in a case where the operation speed of the brake pedal 2 upon the braking determination does not exceed a threshold speed, the control unit 63 switches the second pipe 42 from the cut-off state to the communicated state when the start of the braking is detected by the braking determination as above. On the other hand, in a case where the operation speed upon the braking determination exceeds the threshold speed, the control unit 63 switches the second pipe 42 from the cut-off state to the communicated state after a prescribed period from the braking determination. That is, in this case, the control unit 63 maintains the closed state of the second pipe 42 during the prescribed period and delays a timing to bring the second pipe 42 to the communicated state.

Figure 8:
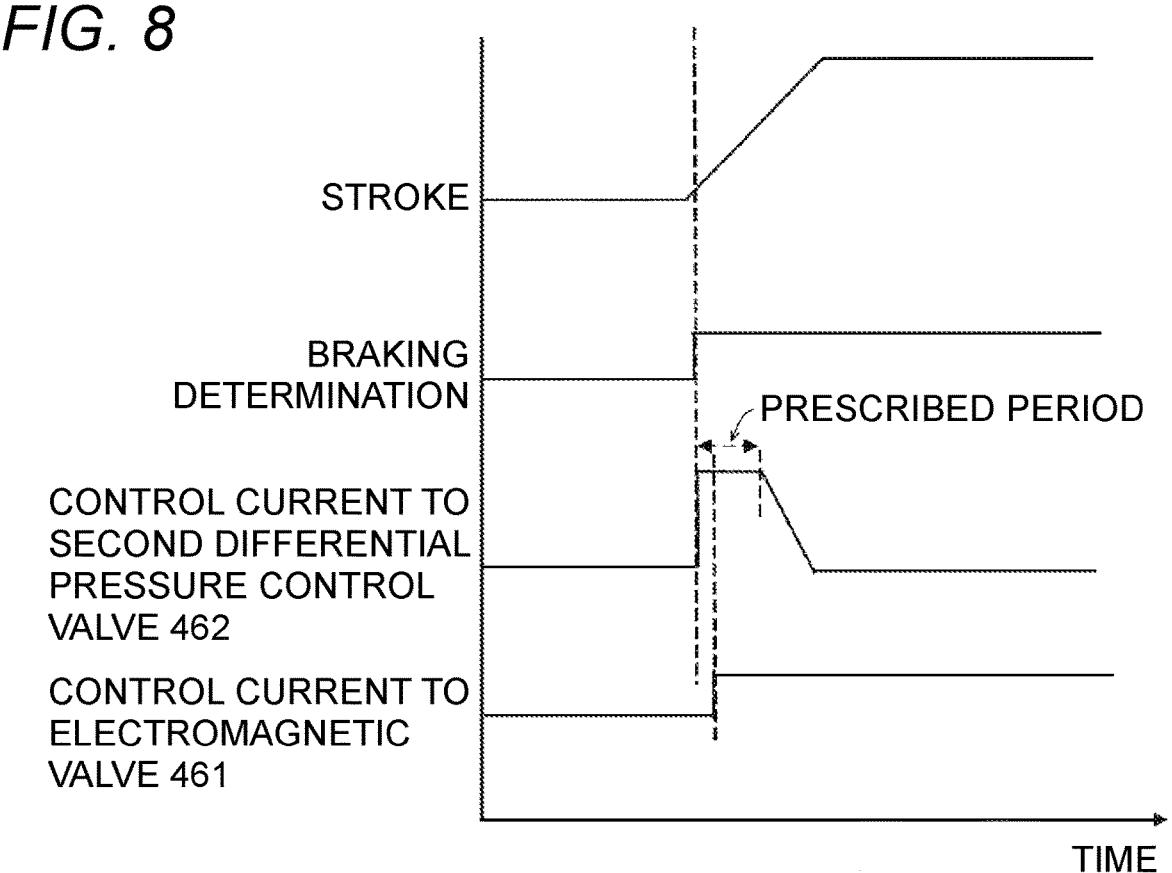
FIG. 8 is a time chart for explaining a control upon sudden braking of the first embodiment.

Specifically, as illustrated in FIG. 8, in the case where the operation speed upon the braking determination exceeds the threshold speed, valve-closing current is applied to the second differential pressure control valve 462 upon the braking determination to delay the application of the valve-opening current to the electromagnetic valve 461 from the timing of the braking determination. That is, the electromagnetic valve 461 is opened after the second differential pressure control valve 462 has closed with high certainty. Due to this, the cut-off state of the second pipe 42 is more surely maintained, and the linear control of the second differential pressure control valve 462 allows the second pipe 42 to gradually shift to the communicated state.

Figure 9:
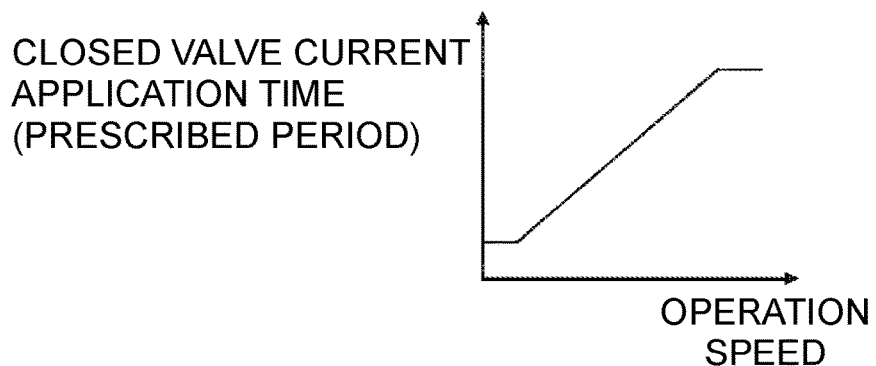
FIG. 9 is an explanatory diagram for explaining a relationship between a closed valve current application time and an operation speed of the first embodiment.

Further, the control unit 63 controls the second differential pressure control valve 462 after the prescribed period from the braking determination such that the second differential pressure gradually reaches 0. This prescribed period, that is, the period during which the valve-closing current is applied to the second differential pressure control valve 462 is set to become longer when the operation speed is larger, as illustrated in FIG. 9. In other words, the control unit 63 controls the second differential pressure control valve 462 such that the prescribed period becomes longer for a larger increasing amount of the request braking force per unit time. After the prescribed period from the braking determination, the control unit 63 gradually (linearly herein) decreases the control current. Due to this, the state of the second pipe 42 moderately shifts from the cut-off state to the communicated state, and a deterioration in brake feeling which may occur when the second pipe 42 is communicated can be suppressed. This control of decreasing the control current is not limited to being linear, and may be in steps.

Further, in this case (case of the sudden braking), the control unit 63 causes the electric pump 47 to start driving upon opening the electromagnetic valve 461 instead of at the time when the start of the braking is detected as in the case of the normal brake operation speed. That is, the electric pump 47 is driven shortly after the valve-closing current application by which the second differential pressure control valve 462 is supposed to have completely closed. Due to this, the electric pump 47 can be driven in the state where the second pipe 42 is more surely cut off, and power consumption can be reduced.

Figure 10:
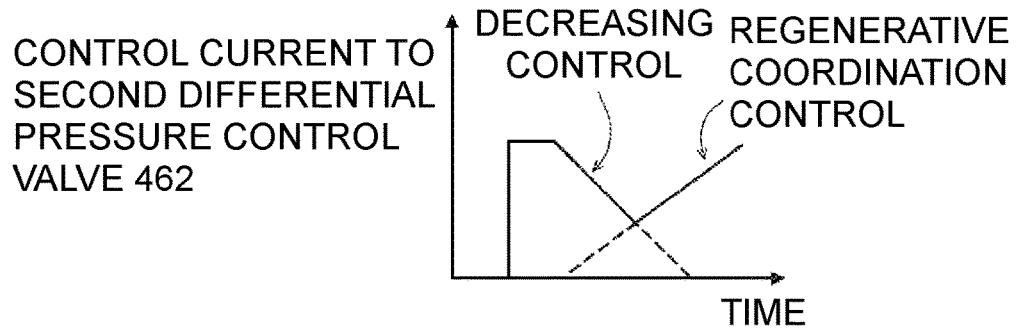
FIG. 10 is an explanatory diagram for explaining the control upon the sudden braking of the first embodiment.

Further, as illustrated in FIG. 10, in a case where a pressure applying instruction for the master pressure is given by the regenerative coordination control of the first embodiment when the control current to the second differential pressure control valve 462 is being decreased (that is, during the decreasing control), the control unit 63 applies the control current with a higher value in one of the regenerative coordination control and the decreasing control to the second differential pressure control valve 462.

Figure 11:
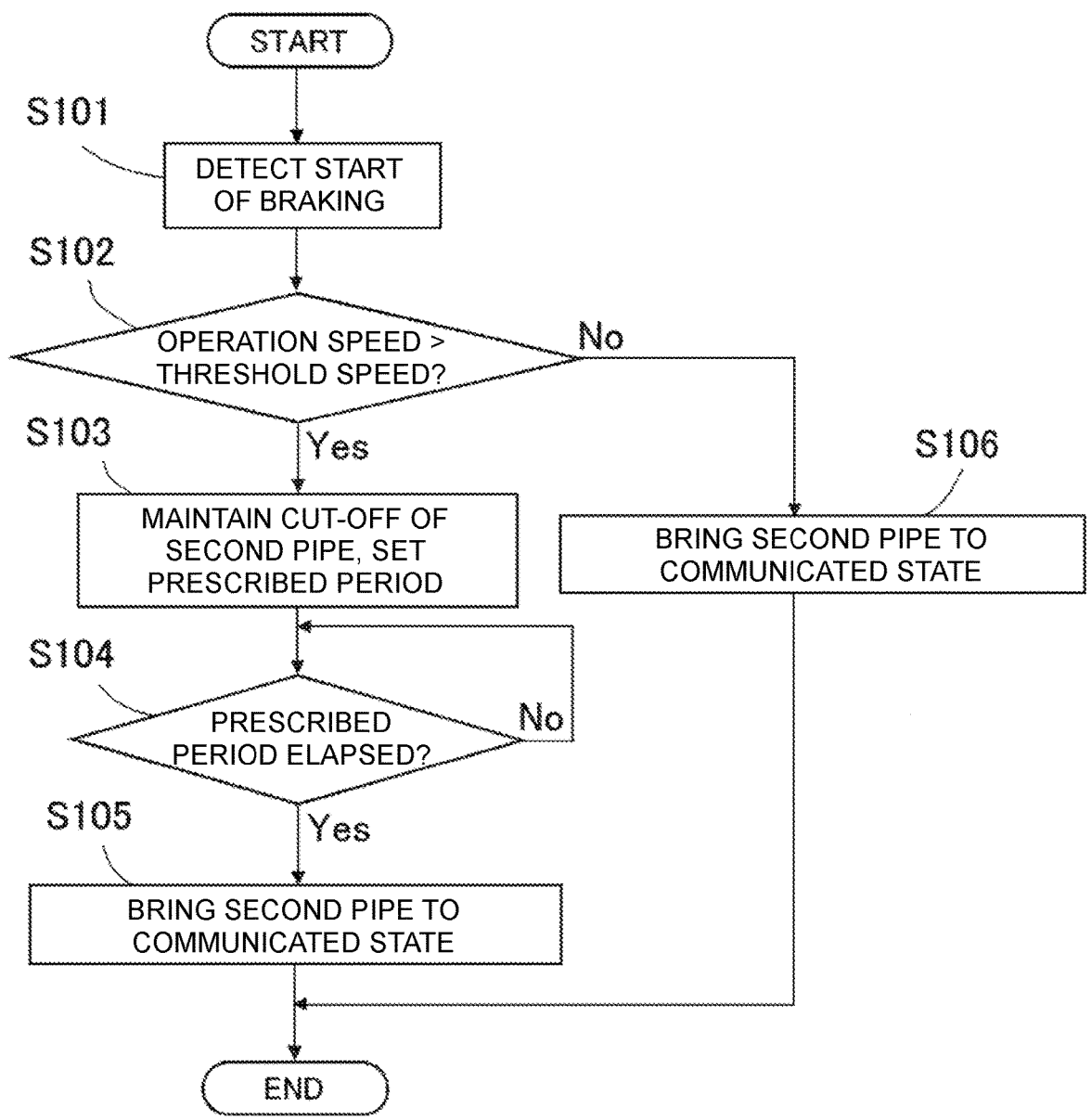
FIG. 11 is a flow chart for explaining a flow of the control of the first embodiment.

As illustrated in FIG. 11, when the brake ECU 6 detects the start of the braking by the braking determination (S101), it determines whether or not the operation speed exceeds the threshold speed (S102). In a case where the operation speed exceeds the threshold speed (S102: Yes), it maintains the cut-off state of the second pipe 42 and sets the prescribed period (S103). Then, after the prescribed period has elapsed (S104: Yes), it starts to gradually release the throttling state so that the second pipe 42 shifts to the non-throttling communicated state (S105). On the other hand, in a case where the operation speed does not exceed the threshold speed (S102: No), it immediately switches the second pipe 42 from the cut-off state to the non-throttling communicated state (S106).

As above, in the case where the operation speed of the brake pedal (corresponding to "brake operating member") 2 when the braking force has been started to be imparted to the wheels W does not exceed the threshold speed, the control unit 63 controls the second valve units 461, 462 such that the second differential pressure becomes zero when the imparting of the braking force to the wheels W starts, and in the case where the operation speed exceeds the threshold speed, it maintains the closed states of the second valve units 461, 462 during the prescribed period since the braking force has been started to be imparted to the wheels W Further, during the period from when the braking force is started to be imparted to the wheels W until the prescribed time elapses, the control unit 63 controls the second valve units 461, 462 such that the period from when the braking force is started to be imparted to the wheels W until the second differential pressure starts to be decreased becomes longer for a larger increasing amount of the request braking force per unit time acquired by the request braking force acquiring unit 61. In the second pipe system 50 as well, the same control as the control of the first pipe system 40 in the foregoing description is performed. Further, in the case with the sudden braking as above, the brake ECU 6 sets the liquid pressure braking forces corresponding to the increase of the master pressure during the prescribed period as the initial liquid pressure braking force, and sets the value that is obtained by subtracting this initial liquid pressure braking force from the request braking force as the target regenerative braking force.

(Effects)

According to the braking device for a vehicle of the first embodiment, in the normal braking operation, the fluid that has flown out of the master cylinder 1 flows into the reservoir 45 through the second pipe 42. Thus, at the start of the braking operation, the increase in the wheel pressures caused by the fluid inflow to the wheel cylinders WC is suppressed, so the generation of the liquid pressure braking forces is suppressed. Due to this, the initial liquid pressure braking force can be brought to zero or made smaller, by which the first request braking force can be increased accordingly, as a result of which the regenerative braking force can be increased. By bringing the initial liquid pressure braking force to zero, the regenerative braking force can be generated at maximum. Further, according to this configuration, an invalid stroke mechanism does not need to be provided in the master cylinder 1 since the fluid is caused to flow into the reservoir 45.

Further, after this, in a situation where the liquid pressure braking forces are necessary, the pressure applying control on the wheel pressures can be performed by controlling the first differential pressure control valve 44 to generate the first differential pressure (#0). The control unit 63 further controls the second differential pressure control valve 462 to generate the second differential pressure (#0) so as to increase the master pressure, and thus can further increase the wheel pressures. As above, the first embodiment enables the pressure applying control suitable for situations in the regenerative coordination by being provided with the first differential pressure control valve 44 and the second differential pressure control valve 462.

Further, according to the first embodiment, for example when the sudden braking is performed, the second pipe 42 is brought to the cut-off state during the prescribed period from the braking determination, and the fluid flown out from the master cylinder 1 is supplied to the wheel cylinders WC. Due to this, in a situation where the braking force is suddenly required, the liquid pressure braking forces can be generated at least in an initial period thereof, and the braking force that is further suitable for the situation can be ensured. Further, according to the first embodiment, after the prescribed period, the control shifts to that which can make maximum use of the regenerative braking force as above.

Further, since this prescribed period becomes longer for a larger operation speed of the brake pedal 2 (corresponding to the increasing amount of the first request braking force per unit time), the liquid pressure braking forces can be ensured for a longer period of time when a degree of the sudden braking is large, and the braking force more suitable for the situation can be ensured.

Further, the first embodiment is provided with the liquid pressure adjustment unit 4 which can implement ABS function and sideslip preventing function, and the aforementioned controls are performed by using the reservoir 45 thereof. That is, the reservoir 45 serves as both an ABS reservoir and the reservoir for the controls of the first embodiment. Due to this, another reservoir does not need to be newly provided, and an increase in a number of components and an increase in manufacturing cost can be suppressed.

Further, in the first embodiment, the combination of the normally-closed electromagnetic valve 461 and the second differential pressure control valve 462 connected serially to the electromagnetic valve 461, configured to open in the electrically non-conducted state, and capable of adjusting the second differential pressure controls the state of the second pipe 42 (communicated, throttling, and cut-off). Due to this, the electromagnetic valve 461 cuts off the second pipe 42 even if the electrically non-conducted state is brought about such as in a case of an electric defect failure, so that the fluid that has flown out from the master cylinder 1 can be supplied to the wheel cylinders WC instead of the reservoir 45. That is, the configuration of the first embodiment is very effective in terms of being fail-safe. In the invalid stroke mechanism in the master cylinder 1, the fluid is not supplied from the master cylinder 1 to the wheel cylinders WC at least during an invalid stroke upon the electric defect failure as with the first embodiment.

Further, according to the first embodiment, the fluid that has been stored in the reservoir 45 by the driver's braking operation when the second pipe 42 is in the communicated state can be used in the pressure applying control (for example, the swap control). Due to this, a fluctuation of the brake pedal 2 (for example, sinking) can be suppressed upon the pressure applying control. Since the brake pedal 2 does not fluctuate during the swap control, an improvement in a regenerating amount can be achieved. An amount of the fluid stored in the reservoir 45 is determined by the brake ECU 6 according to the regenerative braking force that can be output.

Second Embodiment

As compared to the first embodiment, a braking device for a vehicle of a second embodiment differs in that the role of the reservoir 45 is served by the reservoir 17, and that the electromagnetic valve 461 and the second differential pressure control valve 462 are provided only in the first pipe system 40. Thus, only these differing portions will be described. In the description of the second embodiment, the drawings and descriptions of the first embodiment can be referenced. The second embodiment will be described by taking a first pipe system 40 as an example.

Figure 12:
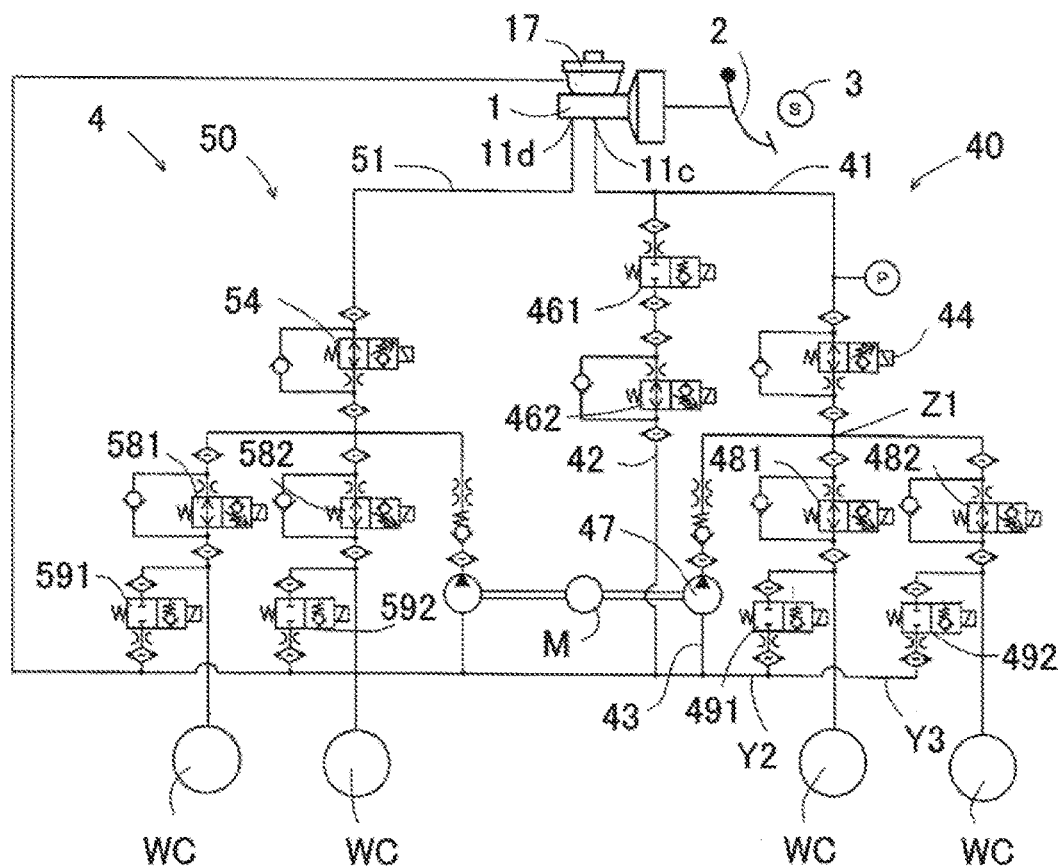
FIG. 12 is a configuration diagram illustrating a configuration of a braking device for a vehicle of a second embodiment.

As illustrated in FIG. 12, a second pipe 42 connects a port 11c of a master cylinder 1 and a reservoir (corresponding to "storage unit") 17. An electromagnetic valve 461 and a second differential pressure control valve 462 are provided on the second pipe 42. A second pipe does not exist in a second pipe system 50. A third pipe 43 connects the reservoir 17 and a branching point Z1. As above, the second embodiment is configured by replacing the reservoir 45 of the first embodiment by the reservoir 17. Further, in the second embodiment as well, regenerative coordination control similar to the first embodiment is performed. "Connected to the reservoir 17" has same meaning as "connecting to the storage chamber 17a".

According to the second embodiment, the reservoir 17 provided in the master cylinder 1 can be used for the regenerative coordination control of the first embodiment, and it further can be used as the reservoir of the liquid pressure adjustment unit 4. Due to this, the increase in the number of components and the increase in the manufacturing cost are suppressed. Further, since the reservoir 17 is an air pressure reservoir, an activation pressure as in an ABS reservoir is not generated, and the increase in the wheel pressures can further be suppressed. That is, the generation of the liquid pressure braking force is further suppressed, and the generation of the regenerative braking force can be maximized. Further, the air pressure reservoir (17) generally has a larger capacity for storing the fluid than the ABS reservoir, so that a greater amount of the fluid can be stored while the second pipe 42 is opened.

Further, since a first master chamber 1A and a second master chamber 1B are configured to hold the same liquid pressure, the same workings and effects can be achieved by the same controls as the first embodiment if the second pipe 42 is connected to one of the master chambers. According to the second embodiment, the second pipe 42, the electromagnetic valve 461, and the second differential pressure control valve 462 are provided in only one of the systems, so that the increase in the number of components and the increase in the manufacturing cost are suppressed.

<Others>

The present invention is not limited to the above embodiments. For example, in the first embodiment, the second pipe 52, the electromagnetic valve 561, and the second differential pressure control valve 562 may be omitted. Further, in the second embodiment, the second pipe system 50 may be provided with a second pipe, an electromagnetic valve, and a second differential pressure control valve. Further, one of the systems may be configured to use the reservoir (45) in which the activation pressure is generated as in the first embodiment, and the other system may be configured to use the air pressure reservoir (17) as in the second embodiment. Further, the reservoirs 45, 55 of the first embodiment may be modified to air pressure reservoirs. The first embodiment or variants thereof and the second embodiment or variants thereof may be combined.

Further, the second pipe 42 may have a normally-closed electromagnetic valve that can adjust the differential pressure, for example, provided instead of the electromagnetic valve 461 and the second differential pressure control valve 462. Further, the master cylinder 1 may be provided with a device that causes a servo pressure to be generated by an electromagnetic valve or an electromagnetic valve and a regulator, or a booster device such as a negative pressure booster or a motor booster. The liquid pressure adjustment unit 4 may be the ABS and the sideslip preventing device as in the present embodiments. Further, the increasing amounts of the operation speed of the brake pedal 2 and the request braking force per unit time are related to each other, and may be replaced with one another in the respective determinations.

The invention claimed is:

1. A braking device for a vehicle provided with a liquid pressure braking device configured to impart a liquid pressure braking force to a wheel, the liquid pressure braking force corresponding to a liquid pressure in a wheel cylinder, and a regenerative braking device configured to impart a regenerative braking force to the wheel, the regenerative braking force being obtained by converting motion energy of the vehicle to electric energy, the braking device for a vehicle comprising:
   a first valve unit provided in a first liquid pressure circuit connecting the wheel cylinder and a master cylinder, and configured to adjust a first differential pressure being a differential pressure between a liquid pressure on the master cylinder side and a liquid pressure on the wheel cylinder side;
   a storage unit forming a storage chamber for storing fluid;
   a second valve unit provided in a second pressure circuit connecting the master cylinder and the storage chamber, and configured to adjust a second differential pressure being a differential pressure between a liquid pressure on the master cylinder side and a liquid pressure on the storage chamber side;
   an electric pump provided in a third liquid pressure circuit connecting a portion of the first liquid pressure circuit on the wheel cylinder side than the first valve unit and the storage chamber, and configured to discharge the fluid in the storage chamber to the portion of the first liquid pressure circuit on the wheel cylinder side of the first valve unit;
   a request braking force acquiring unit configured to acquire a request value corresponding to a value obtained by subtracting the liquid pressure braking force mechanically generated due to a brake operation at the beginning of the brake operation from a total amount of a braking force to be imparted to the wheel;
   a maximum regenerative braking force acquiring unit configured to acquire a maximum value of the regenerative braking force, the maximum value being capable of being imparted to the wheel by the regenerative braking device and being dependent on a rotary speed of the wheel; and
   a control unit configured to control the first valve unit such that the first differential pressure becomes zero and control the second valve unit such that the second differential pressure becomes zero while driving the electric pump during a period since the braking force is started to be imparted to the wheel until the request value acquired by the request braking force acquiring unit exceeds the maximum value acquired by the maximum regenerative braking force acquiring unit.

2. The braking device for a vehicle according to claim 1, wherein
   the control unit is configured to control the first valve unit such that the first differential pressure becomes a first prescribed value and control the second valve unit such that the second differential pressure becomes zero while driving the electric pump in a case where the request value acquired by the request braking force acquiring unit is greater than the maximum value acquired by the maximum regenerative braking force acquiring unit and the request value acquired by the request braking force acquiring unit is equal to or less than a prescribed threshold value, and
   the first prescribed value is a differential pressure value based on a value obtained by subtracting the maximum value acquired by the maximum regenerative braking force acquiring unit from the request value acquired by the request braking force acquiring unit, and
   the prescribed threshold value is a limit value of the regenerative braking force, the regenerative braking force being capable of being imparted to the wheel by the regenerative braking device and being not dependent on the rotary speed of the wheel.

3. The braking device for a vehicle according to claim 2, wherein
   the control unit is configured to control the first valve unit such that the first differential pressure becomes a second prescribed value and control the second valve unit such that the second differential pressure becomes a third prescribed value while driving the electric pump in a case where the request value acquired by the request braking force acquiring unit is greater than the prescribed threshold value, and
   the second prescribed value is a differential pressure value based on a value obtained by subtracting the maximum value acquired by the maximum regenerative braking force acquiring unit from the prescribed threshold value, and
   the third prescribed value is a differential pressure value based on a value obtained by subtracting the prescribed threshold value from the request value acquired by the request braking force acquiring unit.

4. The braking device for a vehicle according to claim 1, wherein
   in a state where no braking force is imparted to the wheel, the second valve unit is closed, and
   in a case where an operation speed of a brake operating member when a braking force starts to be imparted to the wheel does not exceed a threshold speed, the control unit is configured to control the second valve unit when the braking force starts to be imparted to the wheel such that the second differential pressure becomes zero, and in a case where the operation speed exceeds the threshold speed, the control unit is configured to maintain a closed state of the second valve unit for a prescribed period since the braking force starts to be imparted to the wheel.

5. The braking device for a vehicle according to claim 1, wherein
   in a state where no braking force is imparted to the wheel, the second valve unit is closed, and
   during a period from when a braking force starts to be imparted to the wheel until a prescribed time elapses, the control unit is configured to control the second valve unit such that a period from when the braking force starts to be imparted to the wheel until the second differential pressure starts to decrease becomes longer for a greater amount of increase per unit time of the request value acquired by the request braking force acquiring unit.

6. The braking device for a vehicle according to claim 1, further comprising
   a liquid pressure adjustment unit including a pressure boosting valve provided between the master cylinder and the wheel cylinder and configured to open and close a liquid pressure circuit that causes the fluid on the master cylinder side to flow into the wheel cylinder, and a pressure reducing valve provided between the wheel cylinder and a reservoir, and configured to open and close a liquid pressure circuit that causes the fluid in the wheel cylinder to flow out to the reservoir side, wherein the reservoir serves as the storage unit.

7. The braking device for a vehicle according to claim 1, wherein the storage unit is an air pressure reservoir configured to be capable of supplying the fluid to the master cylinder by gravity.

8. The braking device for a vehicle according to claim 1, wherein
the second valve unit includes:
a normally-closed first electromagnetic valve configured to close in an electrically non-conducted state; and
a second electromagnetic valve connected serially with the electromagnetic valve, configured to open in an electrically non-conducted state, and configured capable of adjusting the second differential pressure.

\* \* \* \* \*